(12) United States Patent
Puz et al.

(10) Patent No.: US 10,089,107 B2
(45) Date of Patent: Oct. 2, 2018

(54) METHODS AND SYSTEMS FOR RECORD EDITING IN APPLICATION DEVELOPMENT

(71) Applicant: Apple Inc., Cupertino, CA (US)

(72) Inventors: Nicholas K. Puz, Campbell, CA (US); Jessica S. Cheng, Portola Valley, CA (US); Derrick S. Huhn, San Francisco, CA (US); Kevin R. Lafferty, San Mateo, CA (US); Amol V. Pattekar, San Jose, CA (US); Mitchell B. Rivera, San Francisco, CA (US); Onar Vikingstad, San Jose, CA (US); Richard F. Wagner, San Francisco, CA (US); Jeremy M. Werner, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 490 days.

(21) Appl. No.: 13/913,223

(22) Filed: Jun. 7, 2013

(65) Prior Publication Data

US 2014/0365999 A1 Dec. 11, 2014

(51) Int. Cl.
*G06F 8/71* (2018.01)
*G06F 8/30* (2018.01)

(52) U.S. Cl.
CPC . *G06F 8/71* (2013.01); *G06F 8/30* (2013.01)

(58) Field of Classification Search
None
See application file for complete search history.

(56) References Cited

U.S. PATENT DOCUMENTS

| | | | | |
|---|---|---|---|---|
| 5,517,655 | A | * | 5/1996 | Collins et al. ............... 715/736 |
| 5,806,066 | A | * | 9/1998 | Golshani et al. |
| 6,311,265 | B1 | * | 10/2001 | Beckerle et al. ............ 712/203 |
| 6,631,519 | B1 | | 10/2003 | Nicholson et al. |
| 7,134,072 | B1 | * | 11/2006 | Lovett ............... G06F 17/2247 715/234 |
| 7,272,589 | B1 | * | 9/2007 | Guay et al. ................... 707/716 |

(Continued)

OTHER PUBLICATIONS

Jensen et al, "Protection wrappers: a simple and portable sandbox for untrusted applications", 1998, ACM, Proceedings of the 8th ACM SIGOPS, pp. 104-110.*

(Continued)

*Primary Examiner* — Isaac T Tecklu
(74) *Attorney, Agent, or Firm* — Dickinson Wright RLLP

(57) ABSTRACT

A method of generating a schema including receiving a data record having a record type name and one or more data values is provided. The data values are associated with data value names. The method includes determining whether a set of existing schemas includes a schema associated with the record type name, determining whether the schema includes an element having the same name as a corresponding data element of the record, and validating the corresponding data element against the schema element. A new schema element is added to the schema, the new schema element having the same name and type as the corresponding data element of the record. The method can further include indexing at least one of the one or more data values, which involves querying the indexed data, forming subscription lists for the data values, and forming a derived data value associated with one or more data values.

20 Claims, 6 Drawing Sheets

(56) References Cited

U.S. PATENT DOCUMENTS

| | | |
|---|---|---|
| 7,490,093 B2 | 2/2009 | Jain et al. |
| 8,103,951 B2 | 1/2012 | Schuller et al. |
| 2002/0083048 A1* | 6/2002 | Tenorio et al. .................... 707/2 |
| 2003/0212647 A1* | 11/2003 | Bangel et al. ...................... 707/1 |
| 2004/0059754 A1* | 3/2004 | Barghout et al. ........... 707/104.1 |
| 2004/0139327 A1* | 7/2004 | Brown et al. ................... 713/176 |
| 2004/0189716 A1* | 9/2004 | Paoli et al. .................... 345/853 |
| 2004/0243593 A1* | 12/2004 | Stolte et al. .................. 707/100 |
| 2004/0254953 A1* | 12/2004 | Vincent, III ......... G06F 17/2247 |
| 2005/0160164 A1* | 7/2005 | Benfield et al. .............. 709/223 |
| 2005/0278270 A1* | 12/2005 | Carr ....................... G06Q 10/10 706/25 |
| 2006/0095446 A1* | 5/2006 | Butler et al. .................. 707/100 |
| 2006/0136583 A1* | 6/2006 | Helmstetter et al. ......... 709/224 |
| 2008/0028376 A1* | 1/2008 | Kostoulas ........... G06F 17/2247 717/143 |
| 2009/0150423 A1 | 6/2009 | Spanton et al. |
| 2010/0011446 A1* | 1/2010 | Klucher .................. G06F 21/10 726/27 |
| 2010/0023486 A1* | 1/2010 | Baras et al. ...................... 707/3 |
| 2011/0161375 A1* | 6/2011 | Tedder et al. ................. 707/803 |
| 2011/0320503 A1* | 12/2011 | George .................... H04L 67/16 707/803 |
| 2014/0122518 A1* | 5/2014 | Alufer ............... G06F 17/30303 707/769 |
| 2014/0279828 A1* | 9/2014 | Choudhary ....... G06F 17/30292 707/602 |
| 2014/0365999 A1* | 12/2014 | Puz ........................... G06F 8/30 717/120 |

OTHER PUBLICATIONS

Haas et al, "Transforming Heterogeneous Data with Database Middleware: Beyond Integration", Mar. 1999, IEEE Computer Society, vol. 22 No. 1, pp. 31-36.*

* cited by examiner

METHODS AND SYSTEMS FOR RECORD EDITING IN APPLICATION DEVELOPMENT

FIELD OF THE DESCRIBED EMBODIMENTS

The described embodiments relate generally to methods, devices, and systems for developing applications in datacenters. More particularly, embodiments disclosed herein relate to methods and systems for creating adaptive schemas in live record editing in application development.

BACKGROUND

In current Application development environments, developers define record types in schemas being used for developed Applications every time a new record is created. Developer programs such as JavaScript provide tables of data such as schema lists that may be shared by multiple Applications and different clients. Other configurations may use data arranged in object interchange format rather than in an object storage format (e.g., JavaScript Object Notation—JSON—). Such applications are generally embodied as relational databases. However, such schemas and schema lists have rigid rules for handling data attributes and configurations. In this approach, the burden is on the developer (client) to conform to the data rules at every stage of the Application development. To avoid such complication, other systems simply eliminate the use of schemas and common data tables. The result is an Application that is relatively simple to develop and debug; however, the Application is associated with a data table where every row may have a completely different set of fields. Thus, there is no guarantee of the ability to make cross-row operations with the data. This may severely limit the functionality of a given Application, substantially lowering its market value.

Therefore, what is desired is a development environment that provides a user friendly platform in which to introduce flexible schema with added Application functionality.

SUMMARY OF THE DESCRIBED EMBODIMENTS

According to a first embodiment, a method of generating a schema can include receiving a data record having a record type name and one or more data values. The one or more data values are associated with one or more data value names. The method can further include determining whether a set of existing schemas includes a schema associated with the record type name. If it is determined that the set of existing schemas includes the schema associated with the record type name, then the method may include determining whether the schema includes a schema element having the same name as a corresponding data element of the record. If it is determined that the schema includes a schema element having the same name as the corresponding data element, then the method validates the corresponding data element against the schema element. And, if it is determined that the schema does not include a schema element having the same name as the corresponding data element, then the method adds a new schema element to the schema, the new schema element having the same name and type as the corresponding data element of the record.

According to a second embodiment, a method of generating a schema may include copying a container from a sandbox area of a network server into a production area of the network server and determining whether a copy of the container from the sandbox area already exists in the production area. The method may further include adapting an existing schema in the copy of the container from the sandbox area when it is determined that the copy of the container already exists in the production area, and indexing a plurality of record variables in the existing schema. Also, the method may include locking a data record including the plurality of variables in the existing schema.

In yet another embodiment, a non-transitory computer readable medium is presented, the non-transitory computer readable medium storing commands that when executed by a processor circuit cause the processor circuit to perform a method. The method includes receiving a data record having a record type name and one or more data values and indexing at least one of the one or more data values. In some embodiments, the method may include adding the one or more data values to a schema, querying the one or more data values in the schema, forming subscription lists for the one or more data values in the schema, and forming a derived data value associated with the one or more data values.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

In the figures, elements referred to with the same or similar reference numerals include the same or similar structure, use, or procedure, as described in the first instance of occurrence of the reference numeral.

DETAILED DESCRIPTION OF SELECTED EMBODIMENTS

Figure 1:
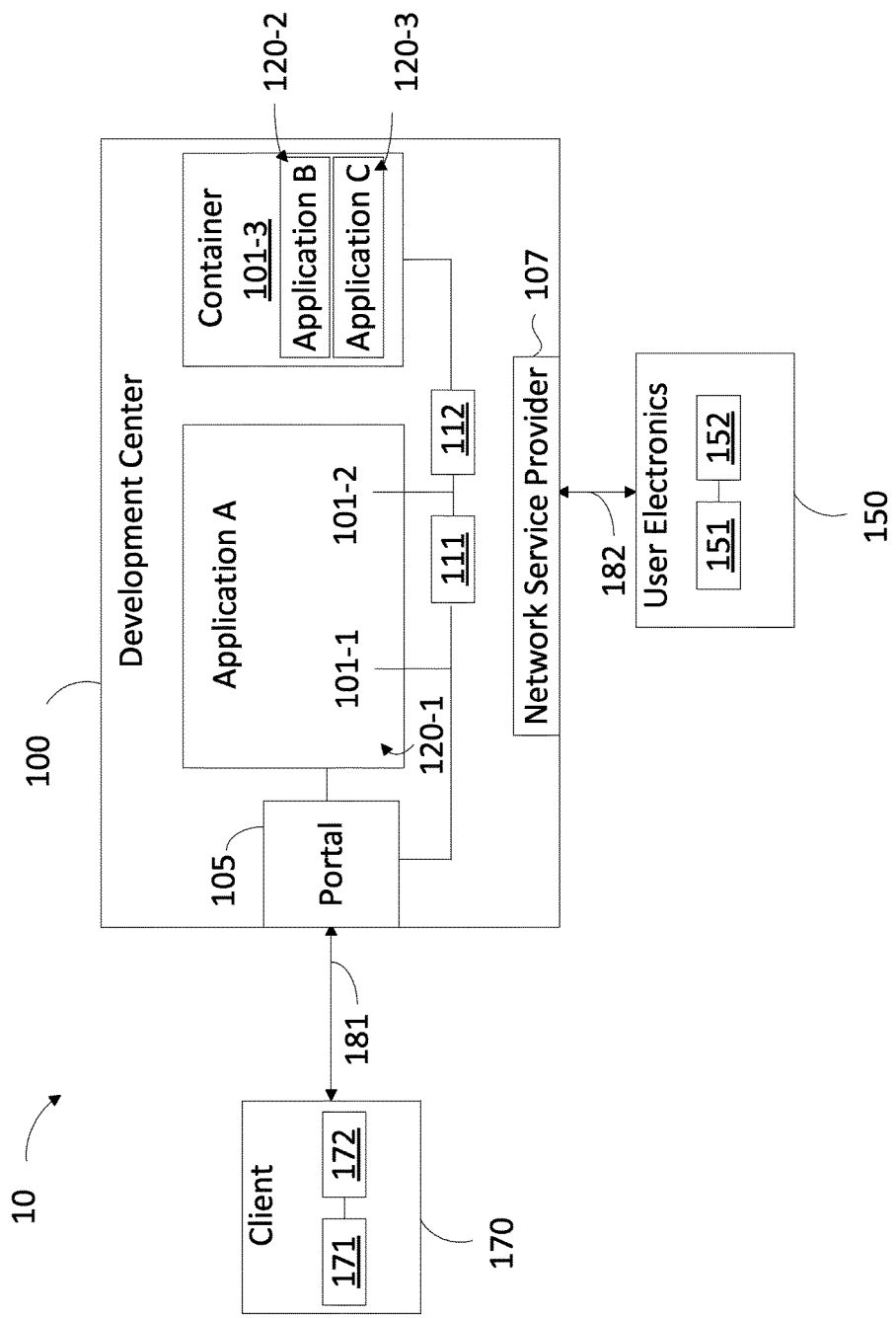
FIG. 1 illustrates a block diagram of a system for record editing in application development, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In the field of network accessible portable electronic devices, Application development is a highly profitable activity. A centralized network provider may establish a server for different vendors to develop datacenter Applications for access by the multiple users of the network. The server may be referred to as 'development center.' In the context of embodiments disclosed herein, vendors that develop datacenter Applications may be referred to as 'developers.' Thus, a developer may be a 'client' in the development center. The client may have access to the development center and certain privileges and rights for modifying code stored in the development center. Users registered with the network provider may have access to the functionalities and services provided by the Application in the development center. The users are able to access and run the Applications through a portable electronic device having network access. Such a portable electronic device may be referred hereinafter to as 'user electronics' (UE). An example of a UE may be a cellular phone, a laptop device, or any other type of handheld electronic appliance having network connectivity such as a tablet or a palm device.

Applications are executable programs including code that is configured to access data structures stored within and managed by the development center. Data structures in Applications include databases and schemas. Schemas are records or lists of variables having values that may be defined by a field types. According to one embodiment, developers do not have to define the record types or schema before developing their code. Instead, they can have their code send records to the development center. The development center analyzes the record and stores a record type having field types based on the received record. As additional writes/insertions of new records are provided by the developer, the new record is compared to the existing record types. If the new record matches at least one the existing record type, then the new record is appropriately entered in the schema. If the new record has not match in the existing record types are entered by the developer, the development center will modify the schema. In some embodiments, the development center may reject the schema modification when there are conflicting schema modifications from the same developer, or from different developers trying to access the same schema.

Embodiments of a development center as disclosed herein provide an environment that enhances the Application development stage. 'User-friendly' environments as disclosed herein allow developers to focus their efforts in functional aspects of their Applications. Handling of data structures such as the schema is made transparent to developer clients. Accordingly, some aspects of the present disclosure include a 'just-in-time' mode to handling data schema by the development center. In some embodiments, a 'just-in-time' quality incorporates ad-hoc inclusion and validation of new fields in the schema as the user 'puts' new records in the Application. In further embodiments, a development center as disclosed herein provides the capability for using derived fields, record subscription and query records. New fields are automatically indexed so they are available for a query operation if the developer desires to include query functionality in the Application. To include functional queries in the Application, the development center updates a record type definition in the schema. Thus, developers may freely experiment with new records according to a desirable functionality of a given Application. Other aspects of the present disclosure include a 'production' mode where data schemas are locked and auto-indexing is locked. In 'production' mode the Application and its resources are readied for release to multiple network users.

In some embodiments, 'user friendly' environments in the development center include adaptive schemas having schema elements created by the development center based on the input received form the client. Adaptive schema may offer derivation, subscription and query, immediately after a field value is keyed in (or 'put') by a client. Another aspect of embodiments as disclosed herein is the ability for the client to view database editors and schema editors via user interface (UI) templates. Thus, embodiments consistent with the present disclosure provide a higher level of operability for Application development. At the same time, embodiments disclosed herein ensure that record types are accessible for calculating derived fields, managing subscriptions, and performing queries.

Data bases and data structures as disclosed herein may include an object storage configuration. Other configurations may use data arranged in object interchange format rather than in an object storage format (e.g., JavaScript Object Notation—JSON—). More generally, data structures as disclosed herein are generally oriented to relational databases.

FIG. 1 illustrates a block diagram of a system 10 for record editing during application development, according to some embodiments. In system 10, a client device 170 interacts with a development center 100 through a network connection 181. A developer portal 105 is configured to receive input commands and data from client device 170 through network connection 181. Developer portal 105 may provide a UI for client device 170, so that the client may 'put' record types, records, field names and field values into development center 100. Development center 100 may include a network server, for example an 'Application' server. A user electronic (UE) device 150 may also access an Application in development center 100 through a network connection 182. Development center 100 may include a network service provider 107 to interface with UE device 150. Each of the client device 170, the development center 100, and the user electronic device 150 may include a memory circuit and a processor circuit. The memory circuits store commands and data which, when executed, cause the processor circuits to perform operations in accordance with embodiments disclosed herein. For example, client device 170 includes processor circuit 171 and memory circuit 172, UE device 150 includes processor circuit 151 and memory circuit 152, and development center 100 includes processor circuit 111 and memory circuit 112.

Development center 100 includes a plurality of Applications 120-1 (Application A), 120-2 (Application B), and 120-3 (Application C), which are collectively referred to hereinafter as Applications 120. Applications 120 include data structures that are manipulated by processor circuit 111 upon request by UE device 150 or Client device 170. Data structures in Applications 120 may be organized in containers 101-1, 101-2, and 101-3 (collectively referred hereinafter as containers 101). The specific correlation between containers 101 and Applications 120 may not be one-to-one. For example, FIG. 1 illustrates Application A associated with containers 101-1 and 101-2, Application B associated with container 101-3, and Application C also associated with container 101-3. Containers 101 may be shared by multiple applications and multiple clients.

In general, a given Application 120 will be associated to or 'developed' by one client 170. In some embodiments, a single client or client device 170 may develop more than one Application 120. One of skill in the art will recognize that the specific number of containers 101 and Applications 120 in development center 100 is not limiting of embodiments consistent with the present disclosure. In other words, any number of Applications 120 and containers 101 may be included in development center 100. Furthermore, the number of Applications 120 may be different from the number of containers 101.

In some embodiments, system 10 for record editing maintains a record type definition in development center 100 that updates available data attributes and their types. If client device 170 attempts to set a value for an attribute that has been previously used, then development center 100 validates the value with the stored attributes. Development center 100 also updates the available attributes according to the data that client device 170 has 'put' into it. Development center 100 enforces schema integrity once a schema has been created. In some embodiments, once the schema has been created, development center 100 may provide high level operations for an Application developer such as creating derived fields, subscription lists, and queries. Accordingly, development center 100 dynamically adjusts the input fields defined in the schema (e.g., in the 'just-in-time' mode). Development center 100 may add new fields to the schema through tabs included in a user interface in developer portal 105.

Figure 2:
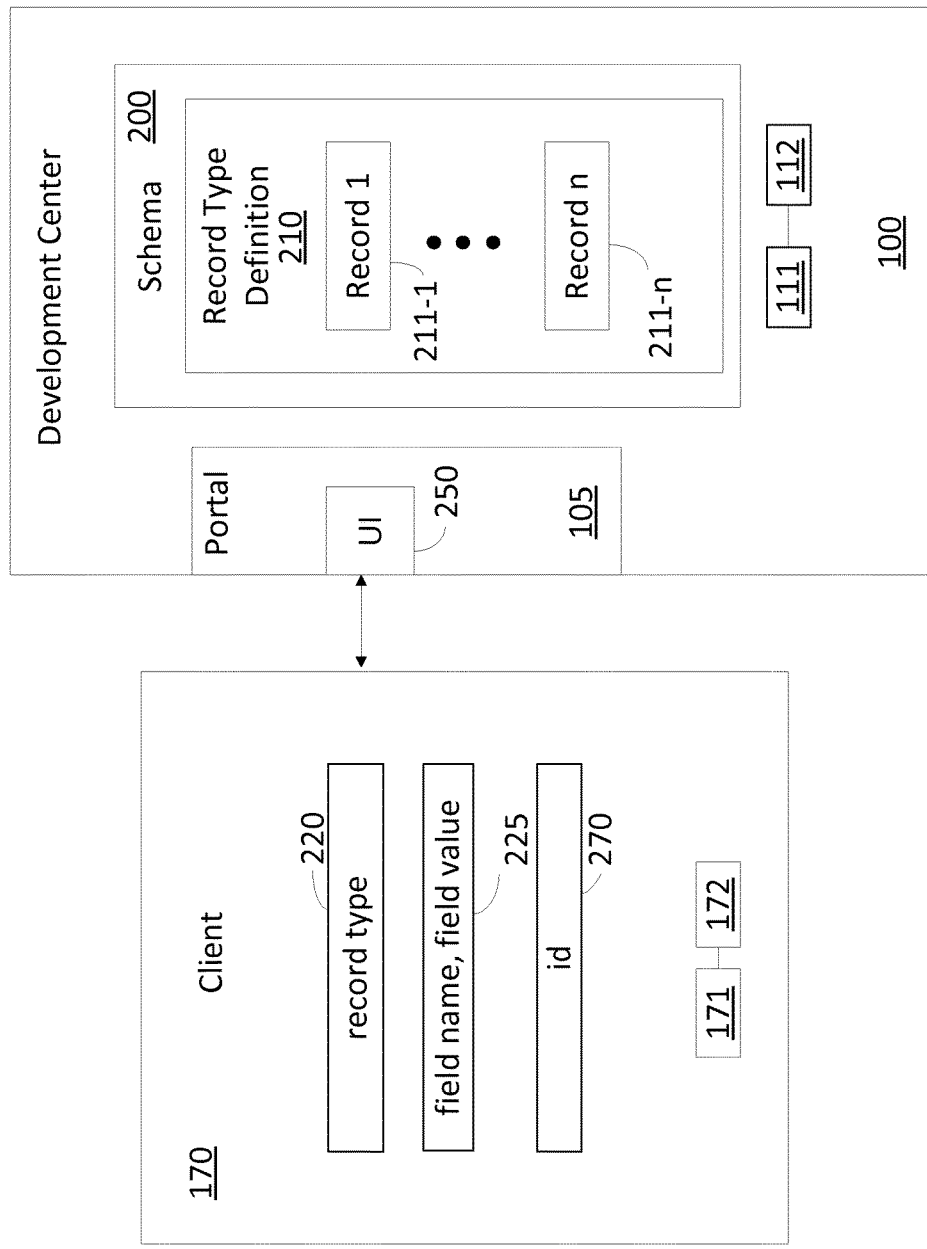
FIG. 2 illustrates a partial block diagram of a system including a client, an application server and a schema for record editing in application development, according to some embodiments.

FIG. 2 illustrates a partial block diagram of system 10 including client device 170, development center 100 and a schema 200 for record editing in application development, according to some embodiments. Client device 170 places a 'put' request specifying a record type 220 and a plurality of field names and field values 225. Also, client device 170 includes an ID 270 so that development center 100 may recognize and provide access and privileges to client device 170.

Record type 220 includes: references, strings, lists, time stamps, numbers of various types, assets and location, among other types known to those skilled in the art. A list may include a string list, or a number list. In one example, the client may desire to set up a record type for a song in an Application handling music streaming. In such case, schema 200 may include records for a field name (e.g., 'title') and a string value associated with the field name (e.g., "Yellow Submarine"). Schema 200 may also include a numeric value (e.g., song year: 1993), and further include string values for genres (e.g., rock, alternative, folk, and others). In another example, a record 225 may include field name 'My location' and two field values: a 'latitude' value and a 'longitude' value. The 'latitude' and 'longitude' values may represent geographic coordinates for 'My location.' In yet another example, record types 220 may include a 'restaurant review.'

Development center 100 includes portal 105 having a UI 250. UI 250 is configured to facilitate input from client device 170 of record types 220. UI 250 may include input tabs for a string and input tabs for a location. Input tabs in UI 250 may include a time picker and a date picker. In some embodiments, the development center provides a record editor in developer portal 105. UI 250 may include a dynamic record editor that presents appropriate controls for each record type 220 as the record type is created or modified. In that regard, a set of controls displayed in the record editor for developer input can be dependent on the field type. In embodiments consistent with the present disclosure, a map in development center 100 relates fields to controls for developer selection of the appropriate control from the field type.

UI 250 may also be configured to provide indexing flights to field names and field values 225. Accordingly, field values 225 may become searchable, sortable, and query-able. In a 'just-in-time' mode, developer center 100 automatically indexes field names 225. In some embodiments of the 'just-in-time' mode, development center 100 indexes every field value, by default. However, multiple indexing may be too expensive in production schema due to the size of the dataset. Thus, in 'production' mode, client device 170 selects whether or not to index a certain field, according to some embodiments.

Schema 200 is dynamically accessible by development center 100 and may be hidden from the developer in client device 170. Developers may view schema 200 in development center 100 through UI 250. Development center 100 maintains a record type definition 210. Record type definition 210 includes a plurality of records 211-1 through 211-$n$ (hereinafter collectively referred to as records 211). The number 'n' may be any integer, as one of skill in the art will recognize. Accordingly, multiple records 211 share the same type definition 210. Record type definition 210 includes name and type for the fields in records 211 associated with record type 220. When development center 100 receives a 'put' request for record type 220 for the first time (e.g., from client device 170), development center 100 bootstraps the record type definition 210. Accordingly, if record type 220 is not included as a record type definition 210 in schema 200, development center 100 creates a new record type definition 210 in schema 200. A later 'put' request from any client with the same record type will result in validation of the type. The later 'put' request may come from client device 170, or from a different client device related to the same client, or from a different client.

The syntax in records 211 is defined by an Application interface (API) in client device 170. Development center 100 recognizes and validates the field type provided by the client. Accordingly, development center is not discovering record type 220, but adapting schema 200. In some embodiments, a later 'put' request from client device 170 may include record 225 with field name 'location2' having 'latitude' and 'longitude' values as well. In such configuration, development center 100 adds a new record 211 into record type definition 210. Thus, in the example above, record 211-1 may be associated with field name 'My location,' and record 211-2 may be associated with field name 'location2' under the same record type definition 210. Accordingly, the operation of development center 100 in schema 200 is transparent to client device 170. Thus, a developer handling client device 170 may efficiently focus in Application development rather than worrying about record type definitions.

For example, a client may be developing an Application including a record type 220 for 'restaurants.' The client may eventually decide to add a record 225 with field name 'location' having 'latitude' and 'longitude' values to the 'restaurants' record type. Furthermore, the client may add query functionality to the coordinate values in the 'location' field for 'restaurants.' Thus, Application users can query the restaurants by location. In some embodiments, multiple 'put' requests for the same record type of totally different records may be added to record type definition 210 in schema 200. Accordingly, record type definition 210 may include a plurality of records of the same type that have been entered by different clients over time.

Figure 3:
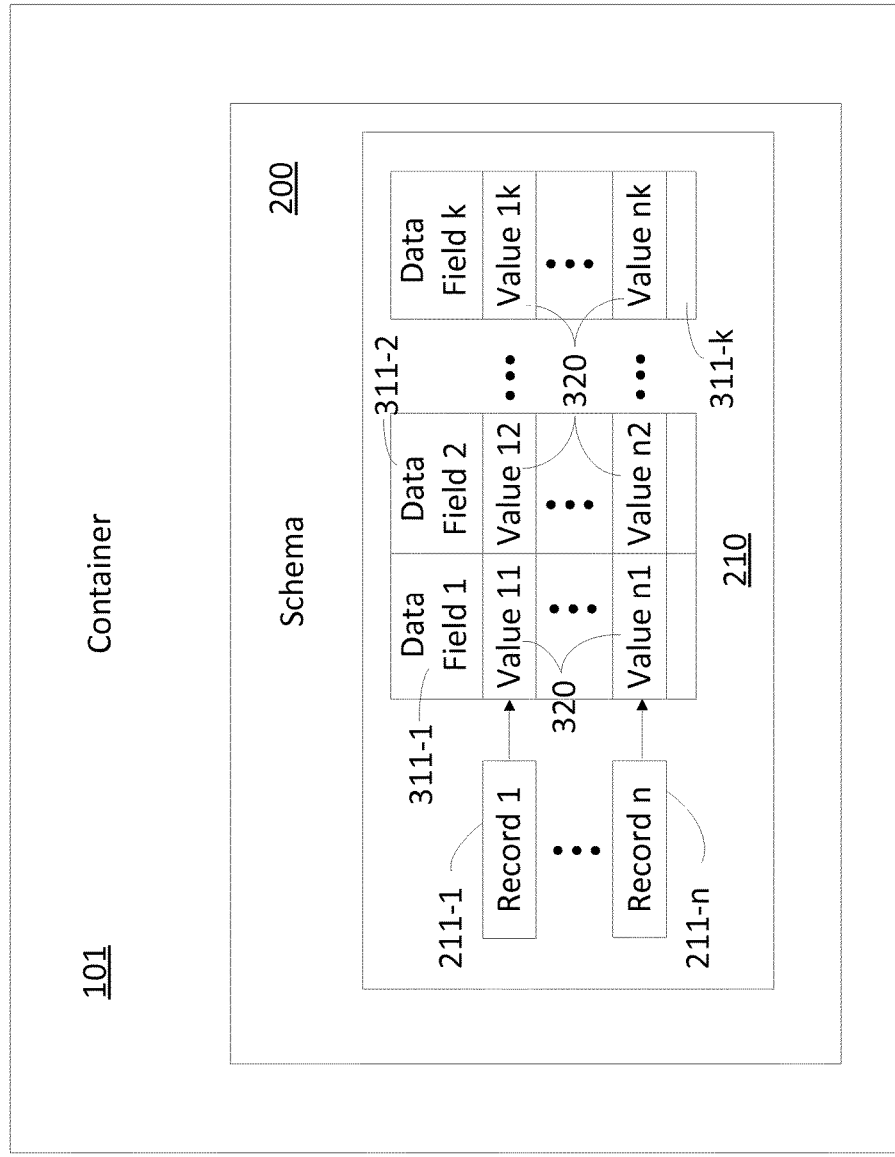
FIG. 3 illustrates a block diagram of a container including a schema having data fields in a system for record editing in application development, according to some embodiments.

FIG. 3 illustrates a block diagram of a container 101 including a schema 200 having data fields 311-1 through 311-*k* (hereinafter collectively referred to as data fields 311) in system 10, according to some embodiments. The value 'k' may be any integer number. Data fields 311 are associated with records 211 (cf. FIG. 2) in record type definition 210. Data fields 311 are reflective of the schema definition. At least one or more of data fields 311 may be indexed. Adding the indexed data values to a schema may enable querying the indexed data values in the schema, forming subscription lists for the indexed data values in the schema, and forming a derived data value associated with the indexed data value. Thus, data fields 311 may include derived field values. For example, data field 311-*k* may include derived field values calculated by development center 100 from values 320 in data fields 311-1 and 311-2. In that regard, calculation of derived fields may be restricted to development center 100, according to some embodiments.

In some embodiments, a developer may use subscription lists to add functionality to an Application. For example, in the 'restaurant' record list discussed above, a derived field may be calculated by development center 100 averaging reviews from the users. Furthermore, a subscription list may provide automatic alerts to certain users about values in the indexed record fields. For example, a user may be alerted about a 'negative' review entry by a restaurant customer. In some embodiments, a subscribed user alert may be issued automatically when a field changes value. This may inform a subscribed user for example of a one star review entered through the Application, in a five star review scale. Or, the subscribed user may be alerted of a five-star review entered through the Application, in a five star review scale. In some embodiments, alerts as described herein may include a device push notification from a server to a user device. For example, development center 100 may send device push notifications to user electronics device 150 in a subscription list, through network connection 182. In some embodiments, development center 100 may send device push notifications to client device 170 in a subscription list, through network connection 181. Accordingly, in some embodiments the subscription lists and derived data values are associated with regular data values that may not be indexed.

Figure 4:
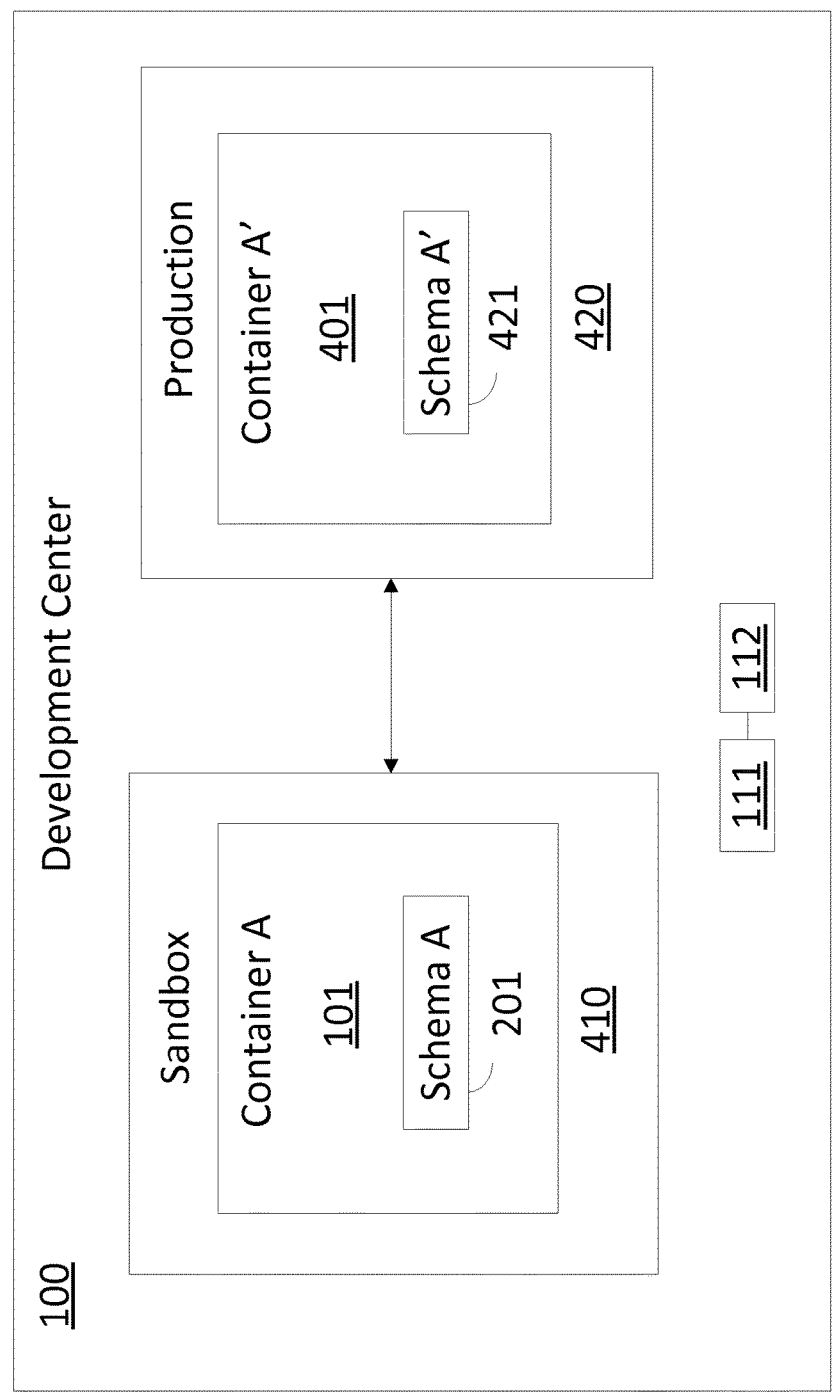
FIG. 4 illustrates a block diagram of an application server having a sandbox area and a production area in a system for record editing in application development, according to some embodiments.

FIG. 4 illustrates a block diagram of a development center 100 having a sandbox area 410 and a production area 420 in a system 10 for record editing in application development, according to some embodiments. Accordingly, development center 100 includes sandbox container A 101 and production container A' 401. Production container 401 may be a copy of development container 101. In some embodiments a promotion process transfers container 101 from sandbox area 410 to container 401 in production area 420.

Developers may access container 101 in sandbox area 410 to create, modify, and improve schemas in the Application. The developer may define the schema locally (i.e., in client device 170) and provide the definition to the development center through developer portal 105. In some embodiments the developer may use a 'just-in-time' schema available in sandbox area 410. Once an Application is ready for access by users, development center 100 transfers all files and data from sandbox area 410 to production area 420. In production area 420, development center 100 provides a tighter mode of Application operation. Schema 200 in sandbox area 410 is dynamically adjusted by development center 100 upon actions by client device 170. A schema in container 401 that has been transferred to production area 420 is locked.

Figure 5:
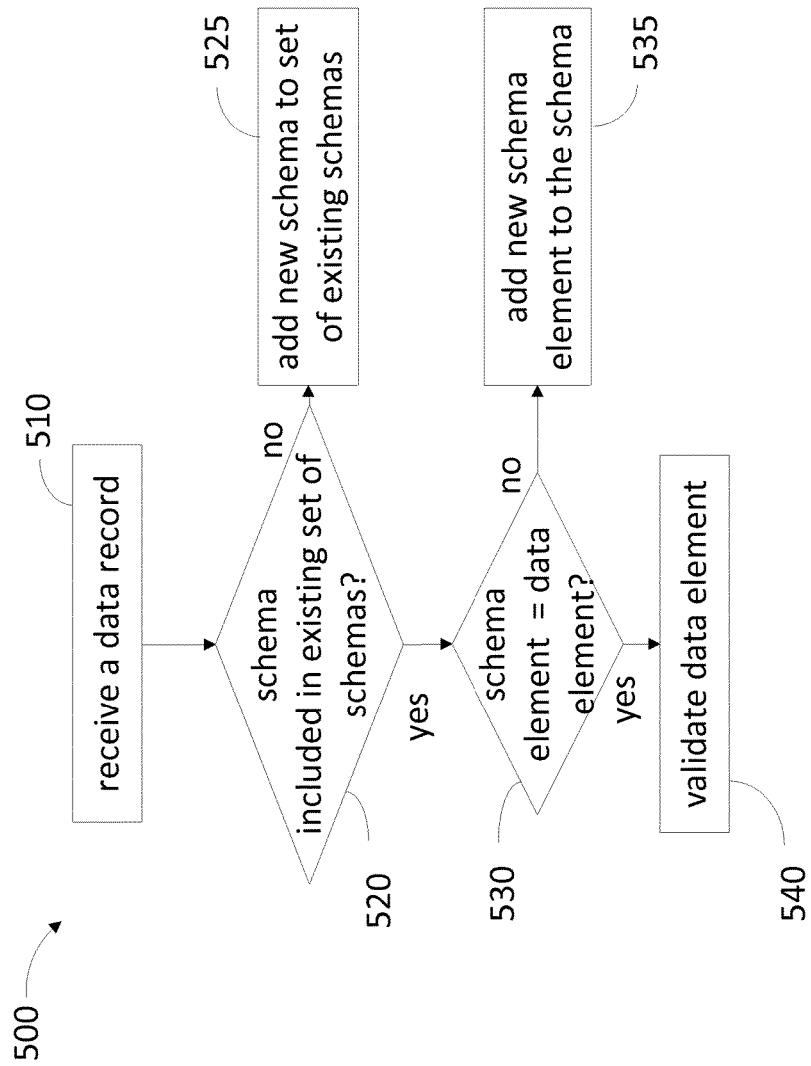
FIG. 5 illustrates a flow chart including steps in a method for generating a schema for record editing in application development, according to some embodiments.

FIG. 5 illustrates a flow chart including steps in a method 500 for generating a schema for record editing in application development, according to some embodiments. The schema in method 500 may be included in a container in a development center of a system for editing in application development (e.g., schema 200, container 101, development center 100, and system 10, cf. FIGS. 1 and 2). Steps in method 500 may be performed partially or completely by a processor circuit in the development center, where the application circuit executes commands stored in a memory circuit (e.g., processor circuit 111 and memory circuit 112, cf. FIG. 1). In some embodiments, steps in method 500 may be performed partially or completely by a processor circuit in a client device, where the processor circuit executes commands stored in a memory circuit (e.g., client device 170, processor circuit 171, and memory circuit 172, cf. FIG. 1).

Step 510 includes receiving a data record having a record type name and one or more data values, wherein the one or more data values are associated with one or more data value names. Step 520 includes determining whether a set of existing schemas includes a schema associated with the record type name. Step 525 includes adding a new schema to the set of existing schema when step 520 determines that the set of existing schemas does not include a schema associated with record type name. Step 530 includes determining whether the schema includes a schema element having the same name as a corresponding data element of the record when step 520 determines that the set of existing schemas includes the schema associated with the record type name.

Step 540 includes validating the corresponding data element against the schema element when step 530 determines that the schema includes a schema element having the same name as the corresponding data element. In some embodiments, step 540 may include rejecting the data record submitted when conflicting schema modifications are encountered. A conflict may arise when a record already exists in the schema with a value of a different type from the submitted value. Step 535 includes adding a new schema element to the schema when step 530 determines that the schema does not include a schema element having the same name as the corresponding data element. Step 535 includes labeling the new schema element with the same name and type as the corresponding data element of the record.

Figure 6:
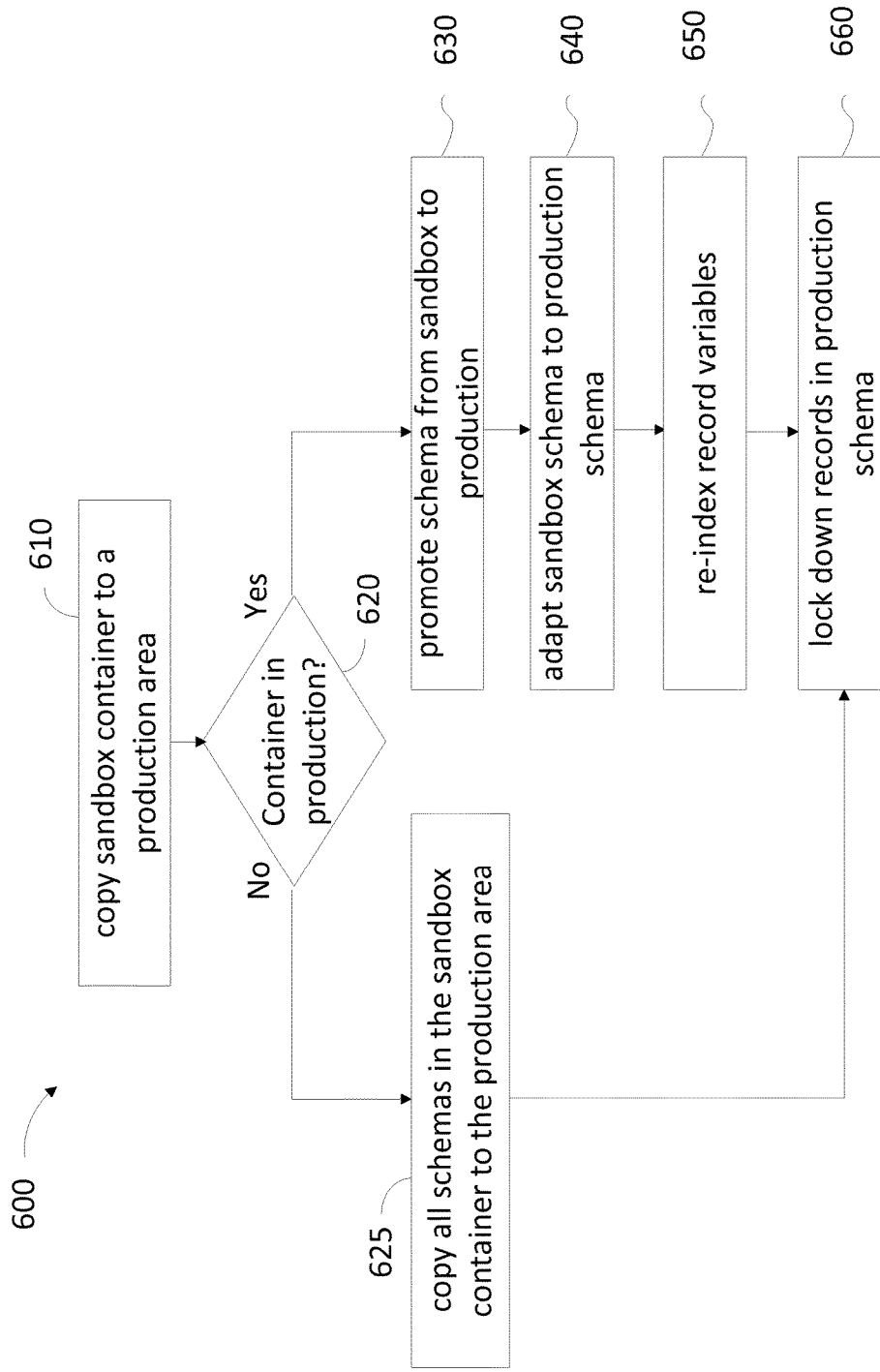
FIG. 6 illustrates a flow chart including steps in a method for promoting a schema from a sandbox area to a production area in an application server, according to some embodiments.

FIG. 6 illustrates a flow chart including steps in a method 600 for promoting a schema from a sandbox area to a production area in an application server, according to some embodiments. The schema in method 600 may be included in a container in the sandbox area of a development center (e.g., schema 201, container 101, development center 100, and sandbox area 410, cf. FIGS. 1, 2, and 4). And the schema in method 600 may be promoted to a schema in a production area of the development center (e.g., schema 421, container 401, and production area 420, cf. FIG. 4). Steps in method 600 may be performed partially or completely by a processor circuit in the development center, the application circuit executing commands stored in a memory circuit (e.g., processor circuit 111 and memory circuit 112, cf. FIG. 1). In some embodiments, steps in method 600 may be performed partially or completely by a processor circuit in a client device, the processor circuit executing commands stored in a memory circuit (e.g., client device 170, processor circuit 171, and memory circuit 172, cf. FIG. 1).

Step 610 includes copying a sandbox container to a production area. In some embodiments, step 610 may include forming a sandbox area and a production area in a development center. Accordingly, in some embodiments the sandbox area and the production area in the development center may be partially or totally included in the memory circuit (e.g., memory circuit 112, cf. FIG. 1). Step 620 includes determining whether a copy of the sandbox container already exists in the production area. Step 625 includes copying all schemas in the sandbox container to the production area when step 620 determines that no copy of the sandbox container exists in the production area. Step 630 includes promoting the schema from the sandbox area to the production area. Step 640 includes adapting the sandbox schema to the production schema. Step 650 includes re-indexing record variables in the production schema. Step 660 includes locking down the records in the production schema.

Once in production the development center locks the schema. Notably, a locked schema can limit data corruption when a given Application operates erroneously (i.e., has bugs). For example, when data indexing is locked, an indexing bug is blocked from entering the production area. Lockdown means no more changes to the schema with limited exceptions. For example, the variable 'location2' inserted as a new field in a 'just-in-time' mode in the sandbox area' may produce an error in production mode. Data validation happens in either mode. Step 660 in method 600 includes stop adding or modifying fields and locking down record type definitions in the schema. Step 660 may also include returning error messages when a client device attempts to update a definition. Accordingly, method 600 reduces the conflicts or errors when multiple Applications running in production mode are looking at the same record in a schema.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for generating a new schema, the method comprising:
   receiving a data record from an application, wherein the data record includes a record type element and one or more data values;
   determining, based on the record type element, whether a schema of a set of existing schemas includes a schema element that matches the record type element;
   in response to identifying that the set of existing schemas includes the schema with the schema element, validating the record type element against the schema element by:
      comparing the schema element to the record type element, and
      generating a validation error when the schema element is incompatible with the record type element; and
   in response to identifying that the set of existing schemas does not include the schema with the schema element:
      generating a container for the new schema, wherein:
         the container is a wrapper for sandboxing and storing the new schema, and
         the container is capable of including additional schemas associated with at least one other application that is distinct from the application, and
      generating the new schema within the container, wherein the new schema includes a new schema element that corresponds to the record type element of the data record.

2. The method of claim 1, further comprising:
   adding additional schema elements to the new schema based on the one or more data values included in the data record.

3. The method of claim 1, further comprising:
   generating an additional schema within the container that is distinct from the new schema, wherein:
      the new schema is associated with the application, and
      the additional schema is associated with a second application that is distinct from the application.

4. The method of claim 1, wherein the record type element comprises at least one of a string, a list, a timestamp, a number, an asset, a location, a reference, or a combination thereof.

5. The method of claim 1, wherein the data record is received via a Hypertext Transport Protocol (HTTP).

6. The method of claim 1, wherein the record type element of the data record is stored in a corresponding field of an indexed table in a data store.

7. The method of claim 6, wherein the data store is a development database, and the method further comprises:
   generating a production database based on the development database, wherein generating the production database comprises:
      copying one or more schemas from the development database that do not exist in the production database to the production database;

merging the one or more schemas from the development database into existing schemas having a same name in the production database;
indexing one or more fields in the production database that have been used in query conditions in the development database; and
locking the one or more schemas in the production database, wherein the one or more schemas are prevented from being changed by subsequently-received data records when locked.

8. The method of claim 7, wherein the development database maintains a record type definition associated with the one or more schemas.

9. The method of claim 1, wherein the record type element comprises a record type name.

10. A computing device configured to generate a new schema, the computing device comprising:
at least one processor; and
at least one memory storing instructions that, when executed by the at least one processor, cause the computing device to:
receive a data record from an application, wherein the data record includes a record type element and one or more data values;
determine, based on the record type element, whether a schema of a set of existing schemas includes a schema element that matches the record type element;
in response to identifying that the set of existing schemas includes the schema with the schema element, validate the record type element against the schema element by:
comparing the schema element to the record type element, and
generating a validation error when the schema element is incompatible with the record type element; and
in response to identifying that the set of existing schemas does not include the schema with the schema element:
generate a container for the new schema, wherein:
the container is a wrapper for sandboxing and storing the new schema, and
the container is capable of including additional schemas associated with at least one other application that is distinct from the application, and
generate the new schema within the container, wherein the new schema includes a new schema element that corresponds to the record type element of the data record.

11. The computing device of claim 10, wherein the at least one processor further causes the computing device to:
add additional schema elements to the new schema based on the one or more data values included in the data record.

12. The computing device of claim 10, wherein the at least one processor further causes the computing device to:
generating an additional schema within the container that is distinct from the new schema, wherein:
the new schema is associated with the application, and
the additional schema is associated with a second application that is distinct from the application.

13. The computing device of claim 10, wherein the record type element comprises a record type name.

14. A non-transitory computer readable medium configured to store instructions that, when executed by a processor of a computing device, cause the computing device to generate a new schema, by performing steps that include:
receiving a data record from an application, wherein the data record includes a record type element and one or more data values;
determining, based on the record type element, whether a schema of a set of existing schemas includes a schema element that matches the record type element;
in response to identifying that the set of existing schemas includes the schema with the schema element, validating the record type element against the schema element by:
comparing the schema element to the record type element, and
generating a validation error when the schema element is incompatible with the record type element; and
in response to identifying that the set of existing schemas does not include the schema with the schema element:
generating a container for the new schema, wherein:
the container is a wrapper for sandboxing and storing the new schema, and
the container is capable of including additional schemas associated with at least one other application that is distinct from the application, and
generating a new schema, wherein the new schema includes a new schema element that corresponds to the record type element of the data record.

15. The non-transitory computer readable medium of claim 14, wherein the steps further include:
generating an additional schema within the container that is distinct from the new schema, wherein:
the new schema is associated with the application, and
the additional schema is associated with a second application that is distinct from the application.

16. The non-transitory computer readable medium of claim 14, wherein the steps further include:
forming one or more subscription lists according to one or more indexed data values associated with the new schema.

17. The non-transitory computer readable medium of claim 16, wherein:
forming one or more subscription lists comprises associating a plurality of users with a plurality of e-mail addresses; and
sending one or more alerts to a user included in the one or more subscription lists comprises sending an e-mail message to an e-mail associated with the user through a network link, wherein the one or more alerts include a device push notification.

18. The non-transitory computer readable medium of claim 14, wherein the record type element comprises at least one of a string, a list, a timestamp, a number, an asset, a location, a reference, or a combination thereof.

19. The non-transitory computer readable medium of claim 14, wherein the record type element of the data record is stored in a corresponding field of an indexed table in a data store.

20. The non-transitory computer readable medium of claim 14, wherein, when the set of existing schemas includes the schema with the schema element, the steps further include:
validating the record type element against the schema element.

* * * * *